(No Model.)   J. DUNCAN.   2 Sheets—Sheet 2.
FORE CARRIAGE.
No. 553,112.   Patented Jan. 14, 1896.
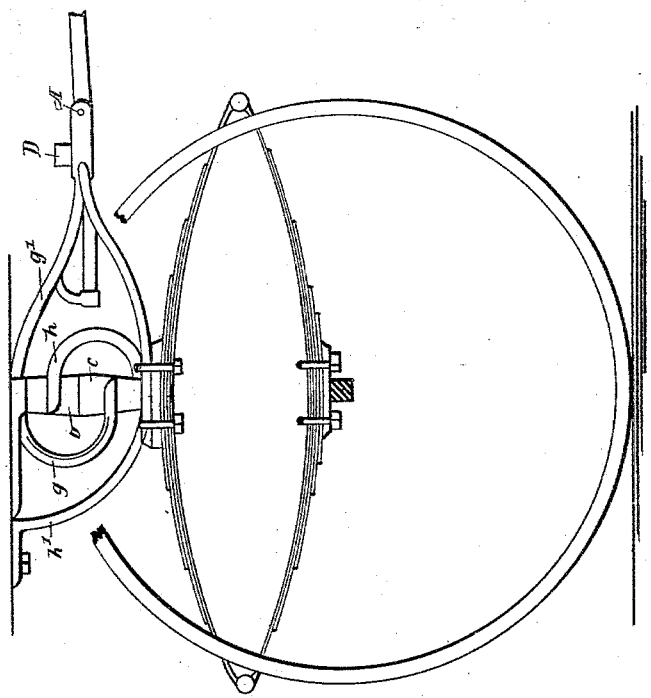
WITNESSES:
INVENTOR
ATTORNEYS.

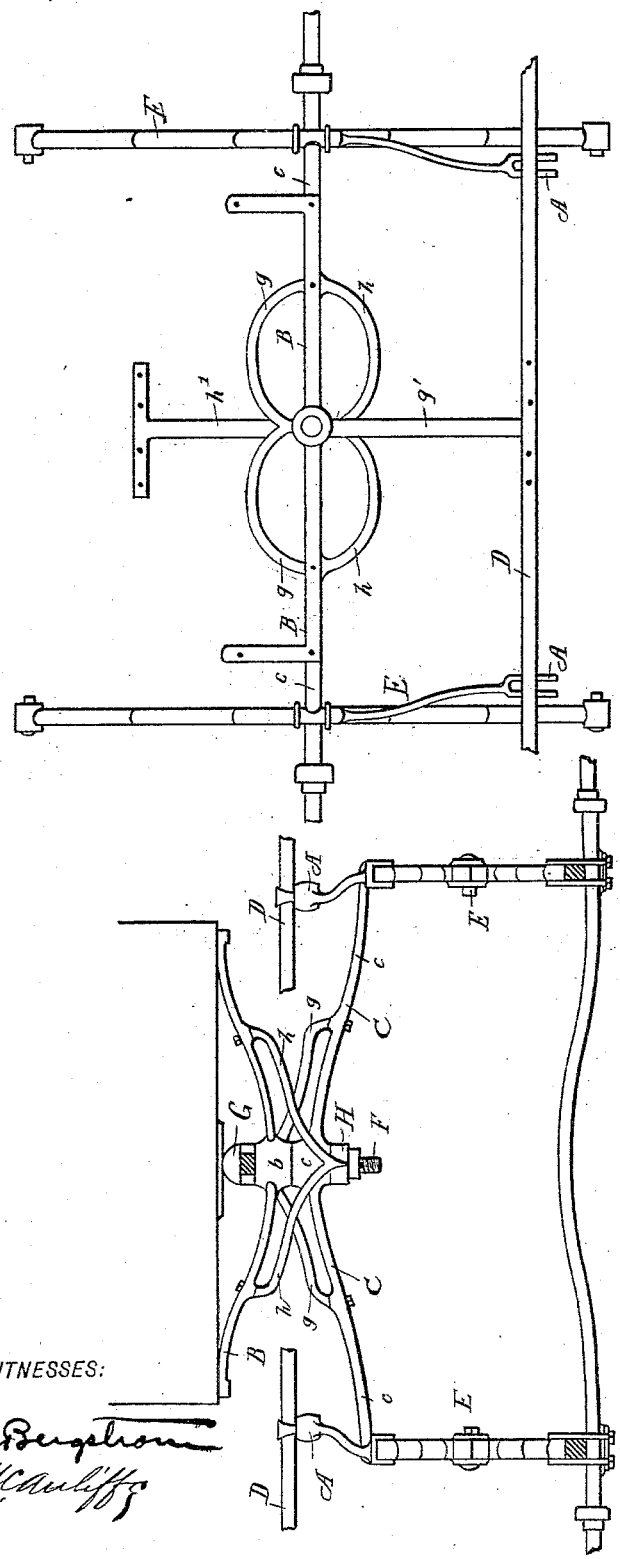

UNITED STATES PATENT OFFICE.

JAMES DUNCAN, OF ADELAIDE, SOUTH AUSTRALIA.

FORE-CARRIAGE.

SPECIFICATION forming part of Letters Patent No. 553,112, dated January 14, 1896.

Application filed July 27, 1894. Serial No. 518,718. (No model.) Patented in South Australia July 31, 1893, No. 2,530; in Victoria October 20, 1893, No. 10,918; in New South Wales October 28, 1893, No. 4,706, and in New Zealand June 19, 1894, No. 6,910.

*To all whom it may concern:*

Be it known that I, JAMES DUNCAN, coachbuilder, a subject of the Queen of Great Britain, and a resident of Franklin Street, Adelaide, in the Colony of South Australia, have invented Improvements in Fore-Carriages of Buggies and other Four-Wheeled Road-Vehicles, of which the following is a specification, and for which I have received patents in South Australia, No. 2,530, dated July 31, 1893; in Victoria, No. 10,918, dated October 20, 1893; in New South Wales, No. 4,706, dated October 28, 1893, and in New Zealand, No. 6,910, dated June 19, 1894.

In fore-carriages as at present constructed, whether of the English or American pattern, the fore-carriage turns upon what is commonly called the "fifth-wheel," which consists essentially of a king-pin forming the center and circular wheel-plates which slide one upon the other, the upper one being secured to the carriage-body and the lower to the turning part of the fore-carriage, but the circular wheel-plates are subject to rapid wear and create a great deal of noise by reason of the vibration making the contact-surfaces rattle.

The term "English fore-carriage" used herein is applied to fore-carriages sometimes known in America as "front-platform carriages," which have side springs placed one at either end of and at right angles to the front axle, the pole-bracket or the shafts being attached to lugs or futchell-ends extending from the spring-bed above the springs.

The term "American fore-carriage" used herein applies to fore-carriages having the front springs (one or more) parallel with the front axle, as commonly used on buggies, phaetons and other vehicles built in America. The poles or shafts of this description of fore-carriage have hitherto been attached to the axle below the springs and a perch or reach provided to connect the front axle to the hind axle or the carriage-body and afford the needed rigidity.

According to my invention when building a vehicle the circular wheel-plates or fifth-wheels, which have heretofore been used in both American and English fore-carriages, are dispensed with and my boss fore-carriage substituted therefor.

The essential feature of my fore-carriage is that it confines the friction to the center of the fore-carriage and thus greatly reduces the wear as well as avoids the rattling hereinbefore referred to occasioned by the contact of the surfaces of the wheel-plates. I substitute in place of the wheel-plates bosses or bosses and collars with stays, which connect with the carriage-body on one hand and with the turning part of the fore-carriage on the other and evenly distribute the strains resulting from working the same. The stays connecting the fixed collar and boss to the carriage-body are made of any curve or shape to suit the style of each vehicle to be fitted. In like manner the stays connecting the turning collar and boss to the turning part of the fore-carriage may be made of any curve or shape adapted to the style and details of each vehicle.

In order that my invention may be more clearly understood, I will now describe the same with reference to the accompanying drawings, in which the same letters indicate like parts in all the figures.

Figures 1, 2, and 3 are front view, plan, and side view, respectively, of my boss fore-carriage applied to an English fore-carriage.

The top bed B is made with a boss $b$ at the center. Attached to the top bed is a stay $h\ h$ extending downwardly and laterally, and connecting the collar H with the boss $b$. The whole is attached to the carriage-body by screws or other convenient means. The spring-bed C is made with a boss $c$ at the center. Attached to the spring-bed is a stay $g\ g$ extending upwardly and laterally and connecting the collar G and the boss $c$. The whole is attached to the springs by suitable clips and thus forms the turning part of the fore-carriage. The king-pin F passes through the two bosses $b$ and $c$ and the two collars G and H and thus secures the fixed and turning parts of the vehicle, allowing the fore-carriage to turn as required. A stay $g'$ extends from collar G forward and downward to the splinter-bar D (see Fig. 3) and keeps up the front part of the fore-carriage and supports the weight of the pole. In like manner a stay $h'$ (see Fig. 3) extends backward and upward from the collar H to the bottom of the carriage-body and resists the straining backward of the fore-carriage in traveling over uneven roads.

Having now particularly described and ascertained the nature of my said invention and in what manner the same is to be performed, I declare that what I claim is—

In a fore-carriage for four wheeled vehicles, a top bed and a spring bed, a boss on the top bed, a boss on the spring bed, a king bolt extending through said bosses, collars surrounding said king bolt, braces extending from the lower of said collars to the top bed, a brace also extending from said lower collar for connection with a vehicle body, and braces extended from the upper of said collars to a connection with the spring bed, substantially as specified.

In testimony that I claim the foregoing as my invention I have signed my name, in presence of two witnesses, this 22d day of May, 1894.

JAMES DUNCAN.

Witnesses:
CHARLES NICHOLAS COLLISON,
ARTHUR GORE COLLISON.